(12) United States Patent
Tsai et al.

(10) Patent No.: US 10,401,200 B2
(45) Date of Patent: Sep. 3, 2019

(54) MULTIFUNCTIONAL SENSOR

(71) Applicant: Winbond Electronics Corp., Taichung (TW)

(72) Inventors: Ming-Chih Tsai, Taichung (TW); Yu-Hsuan Ho, Taichung (TW)

(73) Assignee: Winbond Electronics Corp., Taichung (TW)

( * ) Notice: Subject to any disclaimer, the term of this patent is extended or adjusted under 35 U.S.C. 154(b) by 86 days.

(21) Appl. No.: 15/678,115

(22) Filed: Aug. 16, 2017

(65) Prior Publication Data

US 2018/0231403 A1 Aug. 16, 2018

(30) Foreign Application Priority Data

Feb. 13, 2017 (CN) .......................... 2017 1 0076348

(51) Int. Cl.
*G01D 11/00* (2006.01)
*B33Y 80/00* (2015.01)
*G01D 21/02* (2006.01)

(52) U.S. Cl.
CPC .............. *G01D 11/00* (2013.01); *B33Y 80/00* (2014.12); *G01D 21/02* (2013.01)

(58) Field of Classification Search
None
See application file for complete search history.

(56) References Cited

U.S. PATENT DOCUMENTS

| | | | |
|---|---|---|---|
| 2002/0032531 A1* | 3/2002 | Mansky | ............... B01J 19/0046 702/21 |
| 2009/0263674 A1* | 10/2009 | Liu | ................... H01L 27/14632 428/598 |
| 2011/0095996 A1* | 4/2011 | Yilmaz | ................... G06F 3/044 345/173 |
| 2012/0241822 A1 | 9/2012 | Takenaka et al. | |
| 2014/0111953 A1* | 4/2014 | McClure | ................ G06F 3/044 361/749 |
| 2014/0116122 A1* | 5/2014 | Lammel | ............. G01L 19/0092 73/73 |
| 2014/0354585 A1* | 12/2014 | Cok | ...................... G06F 3/0414 345/174 |
| 2016/0025517 A1* | 1/2016 | Giedd | ...................... G01D 5/16 324/691 |

(Continued)

FOREIGN PATENT DOCUMENTS

| | | |
|---|---|---|
| CN | 102318025 | 1/2012 |
| TW | 201039458 | 11/2010 |

(Continued)

OTHER PUBLICATIONS

Lee, Hsiaug-Yu et al., Integral Sensing Apparatus for Touch and Pressure Sensing, Apr. 21, 2016, machine translation of TW520681 (Year: 2016).*

*Primary Examiner* — Chinessa T. Golden
(74) *Attorney, Agent, or Firm* — JCIPRNET

(57) ABSTRACT

A multifunctional sensor including a substrate, a first sensing structure, a dielectric layer and a second sensing structure is provided. The first sensing structure is disposed on the substrate. The dielectric layer is disposed on the first sensing structure. The second sensing structure is disposed on the dielectric layer. The first sensing structure and the second sensing structure are located on the same side of the substrate.

19 Claims, 10 Drawing Sheets

(56) References Cited

U.S. PATENT DOCUMENTS

2016/0328082 A1* 11/2016 Argiro .................. G06F 3/0416

FOREIGN PATENT DOCUMENTS

| TW | 201200852 |   | 1/2012 |
|----|-----------|---|--------|
| TW | 201207953 |   | 2/2012 |
| TW | 201425889 |   | 7/2014 |
| TW | 201431775 |   | 8/2014 |
| TW | 520681    | * | 4/2016 |
| TW | M528518   |   | 9/2016 |

* cited by examiner

MULTIFUNCTIONAL SENSOR

CROSS-REFERENCE TO RELATED APPLICATION

This application claims the priority benefit of China application serial no. 201710076348.2, filed on Feb. 13, 2017. The entirety of the above-mentioned patent application is hereby incorporated by reference herein and made a part of this specification.

BACKGROUND OF THE INVENTION

Field of the Invention

The invention relates to a multifunctional sensor, and particularly relates to a multifunctional sensor having a plurality of sensing structures located on the same side of a substrate.

Description of Related Art

Conventional multilayer sensing structures are fabricated by a semiconductor process. However, multiple mask processes are required, and the manufacturing cost is quite high. Furthermore, since the multilayer sensing structures include a variety of materials, a plurality of cavities are often required for the deposition, etching and other processes of these materials. Otherwise, it is easy to cause the problem of cross-contamination when a variety of materials are fabricated in a single cavity.

Additionally, in the case of forming multilayer different sensing structures on a single substrate by the semiconductor process, it is possible to cause the damage to a lower layer of the sensing structure which has been formed when forming an upper layer of the sensing structure. Thus, it faces considerable technical challenges.

SUMMARY OF THE INVENTION

The invention provides a multifunctional sensor, which can effectively reduce the volume of the sensor, and the problem of cross-contamination between different materials will not be caused in the forming process.

The invention provides a multifunctional sensor including a substrate, a first sensing structure, a dielectric layer and a second sensing structure. The first sensing structure is disposed on the substrate. The dielectric layer is disposed on the first sensing structure. The second sensing structure is disposed on the dielectric layer. The first sensing structure and the second sensing structure are located on the same side of the substrate.

According to an embodiment of the invention, the first sensing structure includes a first electrode having a resistance variance sensing configuration.

According to an embodiment of the invention, the first sensing structure includes a pressure sensing structure.

According to an embodiment of the invention, the first sensing structure includes a temperature sensing structure.

According to an embodiment of the invention, the first electrode includes a snake-like electrode.

According to an embodiment of the invention, the second sensing structure includes a second electrode and a sensing layer. The second electrode is disposed on the dielectric layer. The sensing layer is disposed on the second electrode.

According to an embodiment of the invention, the multifunctional sensor further includes a heating plate located in a gap of the second electrode.

According to an embodiment of the invention, the multifunctional sensor further includes a light source disposed on the sensing layer or at a periphery of the sensing layer.

According to an embodiment of the invention, the second electrode includes an interdigital electrode or a thin film transistor.

According to an embodiment of the invention, the second electrode has a gap, and the sensing layer is disposed on the second electrode and in the gap of the second electrode.

According to an embodiment of the invention, a sensing material of the sensing layer includes a group IV element or an oxide thereof.

According to an embodiment of the invention, a material of the sensing layer includes silicon, carbon nanotubes, graphene, graphene oxide, zinc oxide, tin dioxide, indium oxide, tungsten trioxide, magnesium oxide, titanium dioxide, ferric oxide, nickel, copper, Au clusters, or a combination thereof.

According to an embodiment of the invention, a method of forming the first sensing structure includes three-dimensional printing.

According to an embodiment of the invention, a method of forming the dielectric layer includes three-dimensional printing.

According to an embodiment of the invention, a method of forming the second sensing structure includes three-dimensional printing.

According to an embodiment of the invention, a material of the substrate includes a porous material, and a portion of the first sensing structure extends into pores of the substrate.

According to an embodiment of the invention, a material of the substrate includes a nano-cellulose material.

According to an embodiment of the invention, a pore size of pores of the nano-cellulose material is 0.2 nanometers to 500 nanometers.

According to an embodiment of the invention, the first sensing structure includes a first electrode and a first electrode sensing layer. The first electrode is disposed on the substrate. The first electrode sensing layer is disposed on the first electrode.

According to an embodiment of the invention, the first electrode is an interdigital electrode.

Based on the above, the plurality of sensing structures of the multifunctional sensor of the invention are located on the same side of the same substrate which can effectively reduce the volume of the multifunctional sensor. Additionally, the multifunctional sensor of the invention which is formed by the three-dimensional printing method can avoid the damage to the lower layer of the sensing structure which has been formed when forming the upper layer of the sensing structure, and the problem of cross-contamination between different materials will not be caused.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
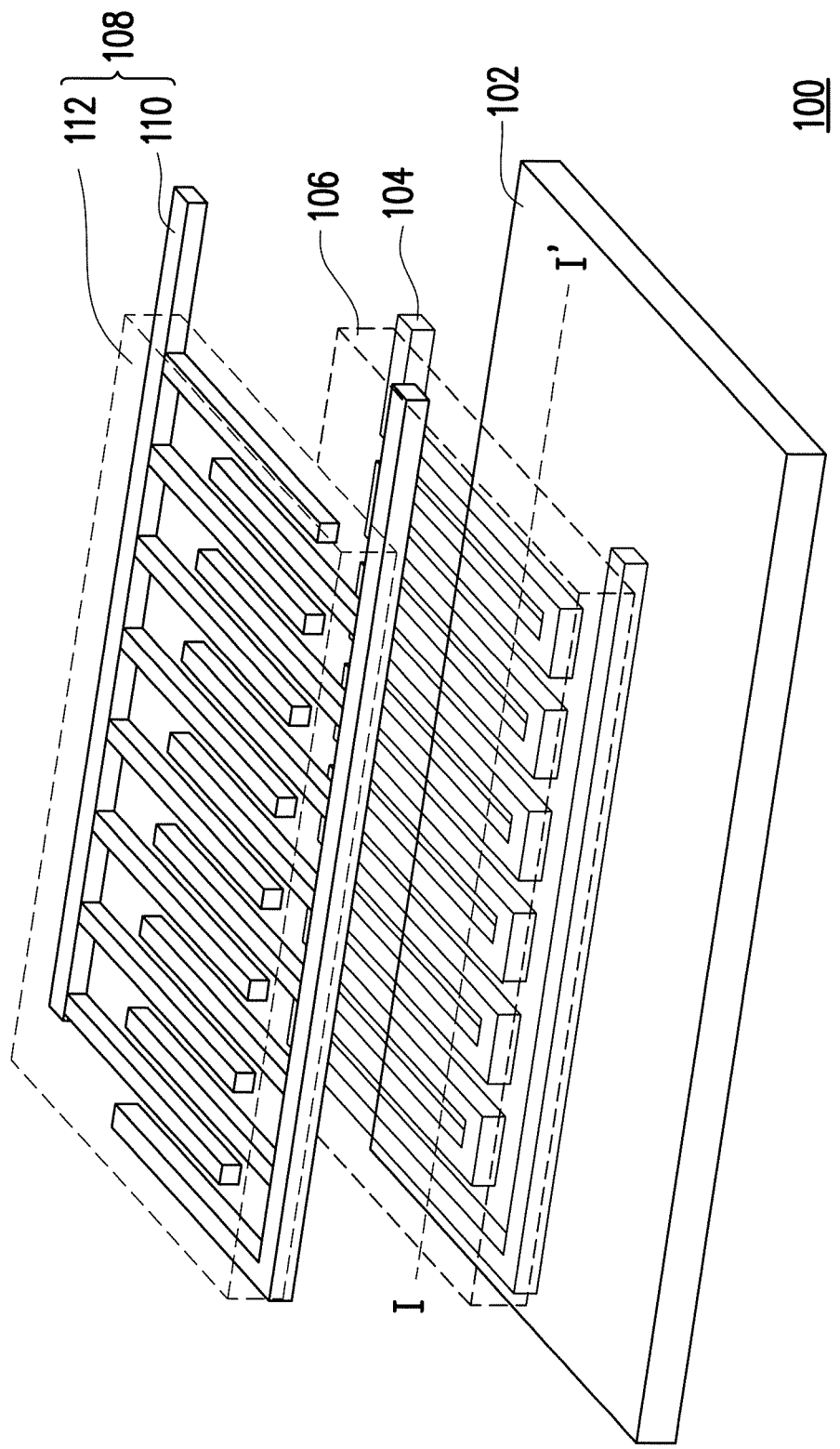
FIG. 1A is a schematic view of a multifunctional sensor according to an embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
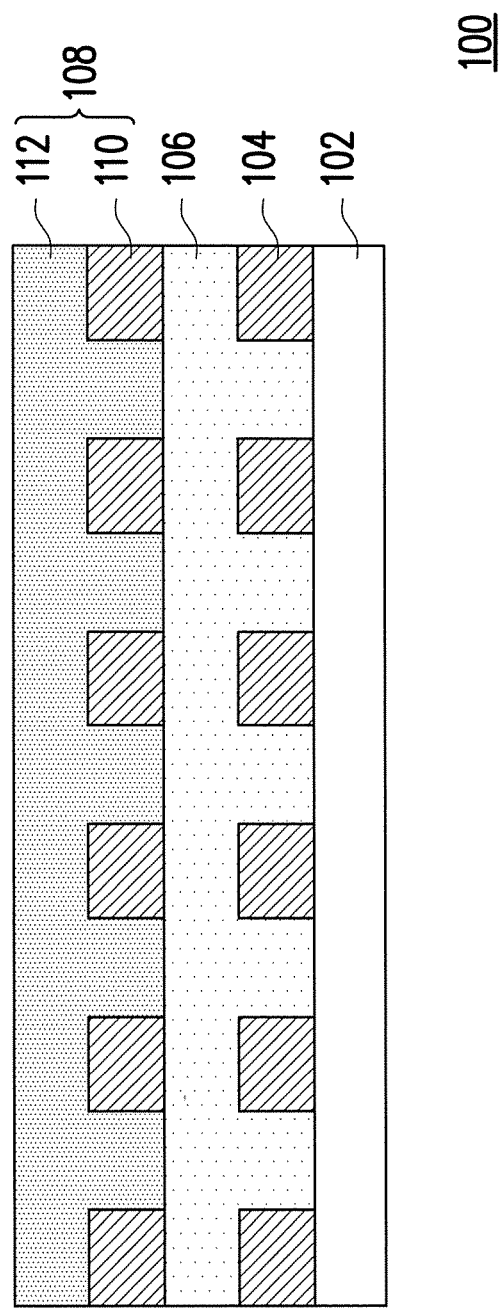
FIG. 2 is a schematic cross-sectional view of the multifunctional sensor in the embodiment of FIG. 1A of the invention along a line I-I'.

FIG. 1A is a schematic diagram of a multifunctional sensor 100 according to an embodiment of the invention. FIG. 2 is a schematic cross-sectional view of the multifunctional sensor in the embodiment of FIG. 1A of the invention along a line I-I'. Referring to FIG. 1A and FIG. 2, the multifunctional sensor 100 of an embodiment of the invention includes a substrate 102 and a first sensing structure 104, a dielectric layer 106 and a second sensing structure 108 disposed from bottom to top. The first sensing structure 104 is disposed on the substrate 102. The dielectric layer 106 is disposed on the first sensing structure 104. The second sensing structure 108 is disposed on the dielectric layer 106. The first sensing structure 104 and the second sensing structure 108 are located on the same side of the substrate 102. A plurality of sensing structures of the multifunctional sensor of the invention are located on the same side of the same substrate which can effectively reduce the volume of the multifunctional sensor.

Figure 3:
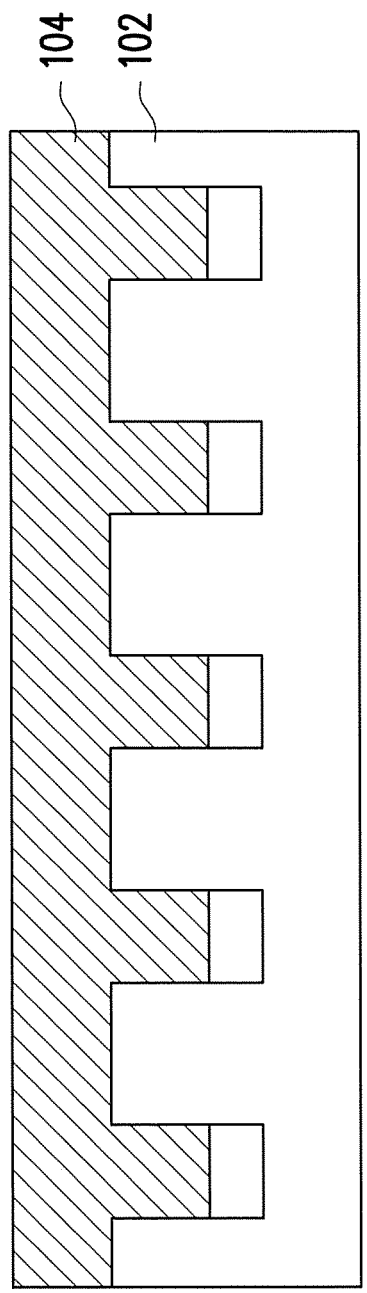
FIG. 3 is a schematic view of a configuration of a first sensing structure and a substrate according to an embodiment of the invention.

In an embodiment, a material of the substrate 102 includes a porous material. FIG. 3 is a schematic view of a configuration of a first sensing structure and a substrate according to an embodiment of the invention. Referring to FIG. 3, the porous material of the substrate 102 has an appropriate pore size, so that a portion of the first sensing structure 104 on the substrate 102 extends into the pores of the substrate 102. Thus, an adhesion between the first sensing structure 104 and the substrate 102 can be improved. In another embodiment, the material of the substrate 102 may also be a flexible material. The material of the substrate 102 is a nano-cellulose material, nylon, polyether sulfone, acetate cellulose, polyfluortetraethylene, polyvinylidene fluoride, glass fiber, cycloolefin polymer (COP), polyethylene, or a combination thereof, for example. However, the material of the substrate 102 is not limited thereto, which may also be other porous materials. In the embodiment that the substrate 102 is the nano-cellulose material, the pore size of the pores thereof is 0.2 nanometers to 500 nanometers, for example.

In an embodiment, the first sensing structure 104 is a first electrode having a resistance variance sensing configuration, for example. The resistance variance sensing configuration is a meandering configuration with regular twists and turns, for example. The first electrode having the resistance variance sensing configuration may sense the applied strain value by the resistance variance caused by the deformation, which is a pressure sensing structure and can be used as a strain gauge. In another embodiment, the first electrode having the resistance variance sensing configuration may sense the temperature value by the resistance variance caused by the temperature, which is a temperature sensing structure having a temperature sensing function. In an embodiment, the first electrode having the resistance variance sensing configuration is a snake-like electrode, for example, and a material thereof is gold, platinum, palladium, silver, copper, nickel, aluminum, or carbon, for example.

Figure 1B:
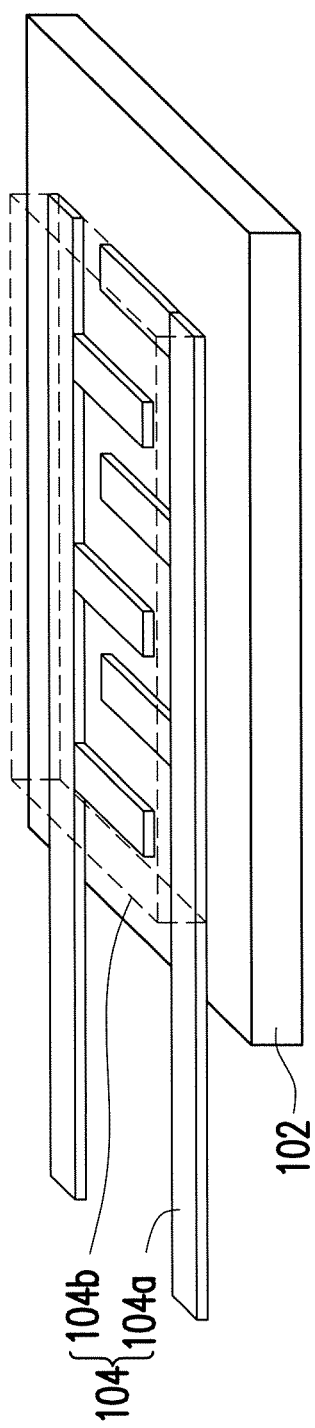
FIG. 1B to FIG. 1E are partial schematic views of multifunctional sensors according to other embodiments of the invention.
Figure 1C:
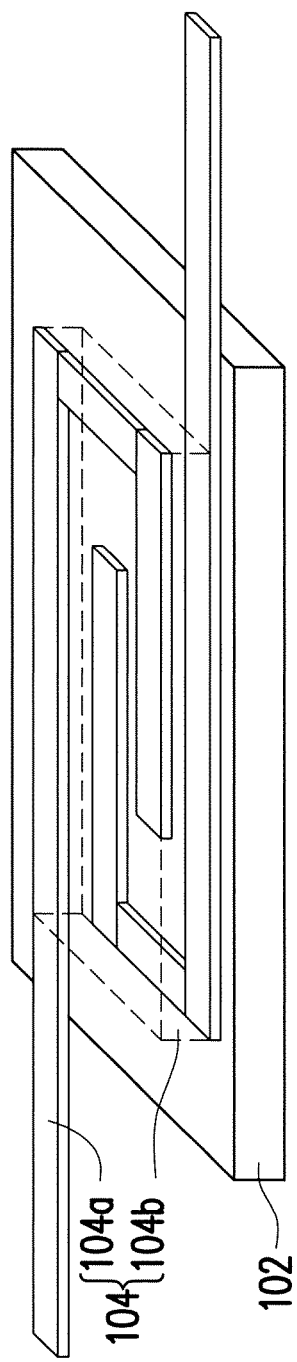
Figure 1D:
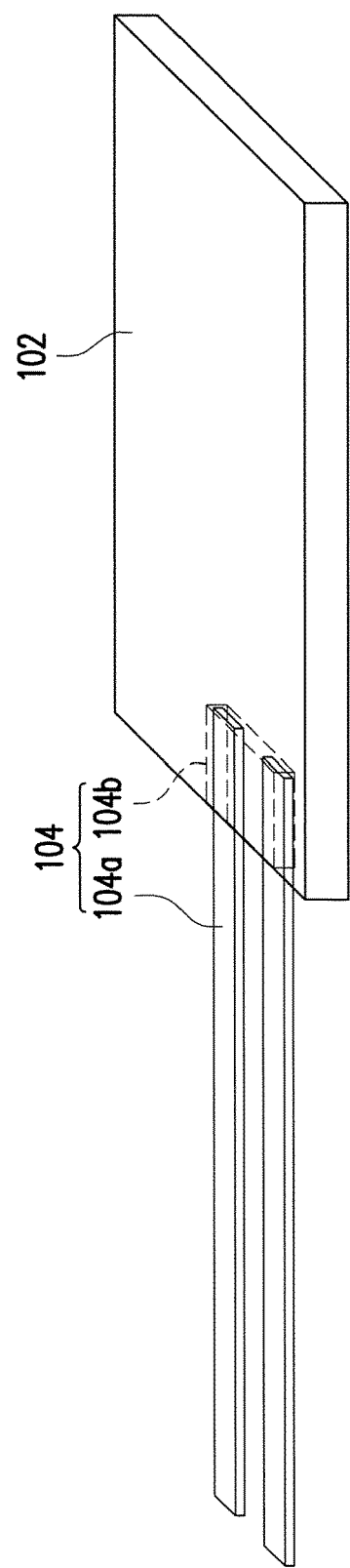
Figure 1E:
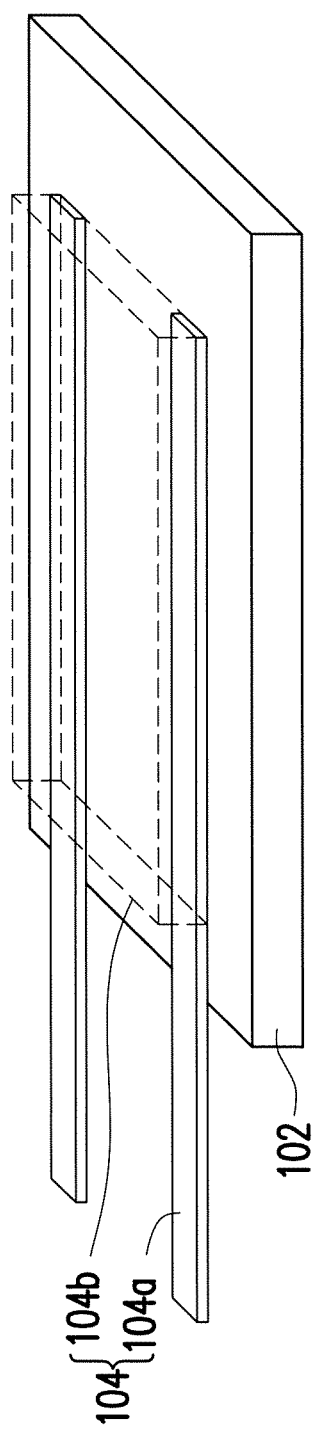

FIG. 1B to FIG. 1E are partial schematic views of multifunctional sensors according to other embodiments of the invention. In the embodiments of FIG. 1B to FIG. 1E, the first sensing structure 104 is a thermistor, for example. The first sensing structure 104 has a first electrode 104a and a first electrode sensing layer 104b. The first electrode sensing layer 104b is located on the first electrode 104a. In the embodiment of FIG. 1B, the first electrode 104a is an interdigital electrode, for example. End points of the interdigital electrode are on the same edges of the substrate 102 and electrically connected to each other from the same side of the substrate 102. In the embodiment of FIG. 1C, the first electrode 104a is an interdigital electrode, for example, and the end points of the interdigital electrode are on two edges of the substrate 102 and electrically connected to each other from the two edges of the substrate 102. In the embodiment of FIG. 1D, the first electrode 104a is located at a corner of the substrate 102 and has a parallel configuration, for example. In the embodiment of FIG. 1E, the first electrode 104a is located near the center of the substrate 102 and has a parallel configuration, for example. In the embodiments of FIG. 1B to FIG. 1E, a material of the first electrode 104a is gold, platinum, palladium, silver, copper, nickel, aluminum, carbon, or a combination thereof, for example. The first electrode sensing layer 104b is, for example, a ceramic material, such as NiO, CuO, CoO, $Fe_2O_3$, ZnO, $TiO_2$, $ZrO_2$, $HfO_2$, $WO_3$, $V_2O_5$, $MoO_3$, $CaTiO_3$, $SrTiO_3$, or $BaTiO_3$.

In an embodiment, the dielectric layer 106 covers the first sensing structure 104, so as to provide the protection for the first sensing structure 104. The dielectric layer 106 may also be used as another substrate, so that other material layers are formed thereon. By the design of vertically stacked substrate, the volume of the multifunctional sensor of the invention can be effectively reduced. A material of the dielectric layer 106 is silicon dioxide, epoxy, polyimide, nano-cellulose, or a combination thereof, for example. In some embodiments, a thickness of the dielectric layer 106 is 0.5 micrometers to 150 micrometers, for example. If the thickness of the dielectric layer 106 is too thick, the sensitivity of the first sensing structure 104 is decreased. If the thickness of the dielectric layer 106 is too thin, the dielectric layer 106 cannot provide the appropriate protection for the first sensing structure 104. The dielectric layer 106 has an appropriate thickness, and thus the multifunctional sensor has better functional performance.

The second sensing structure 108 may provide gas sensing, ultraviolet light sensing, humidity sensing, or temperature sensing functions, for example. The second sensing structure 108 includes a second electrode 110 and a sensing layer 112. The second electrode 110 is disposed on the dielectric layer 106. The sensing layer 112 is disposed on the second electrode 110. In an embodiment, the second electrode 110 has a gap. The sensing layer 112 is disposed on the second electrode 110 and in the gap of the second electrode 110. A sensing material of the sensing layer 112 is, for example, a group IV element or an oxide thereof, such as silicon or carbon. The carbon may be carbon nanotubes or graphene. The carbon oxide may be graphene oxide. The sensing material of the sensing layer 112 may also be metal oxide, such as zinc oxide, tin dioxide, indium oxide, tungsten trioxide, magnesium oxide, titanium dioxide, ferric oxide, or a combination thereof. In some other embodiments, the sensing material of the sensing layer 112 may also be metal, such as nickel, copper, Au cluster, or a combination thereof. As shown in Table 1, according to different selected sensing materials, the sensing layer 112 may sense different types of gas molecule, ultraviolet light, humidity, or temperature.

so that the functional structure can be disposed therein. In another embodiment, the multifunctional sensor of the invention may have a plurality of second electrodes 110, and the plurality of second electrodes 110 have a gap therebetween. The gap between the plurality of second electrodes 110 has an appropriate size, so that the functional structure can be disposed therein. In an embodiment, the second electrode 110 is an interdigital electrode or a thin film transistor, for example.

Figure 4:
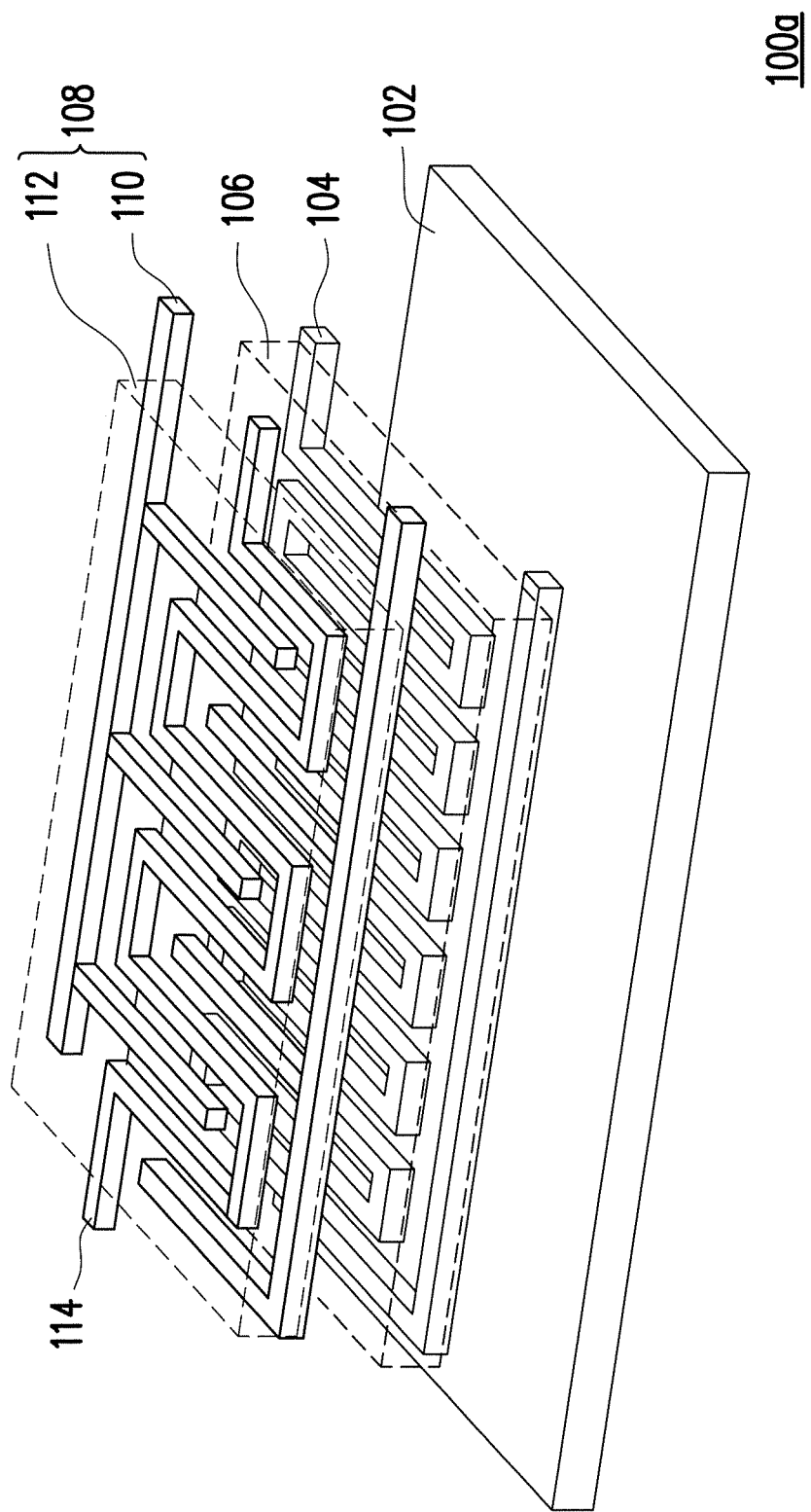
FIG. 4 is a schematic view of a multifunctional sensor according to another embodiment of the invention.

In an embodiment, the multifunctional sensor 100a further includes a heating plate 114. FIG. 4 is a schematic view of a multifunctional sensor 100a according to another embodiment of the invention. Referring to FIG. 4, the heating plate 114 is disposed in the gap of the second electrode 110. Thereby, the multifunctional sensor 100a of the invention may have more diverse functions. For instance, the gas may be heated by the heating plate 114 to accelerate the disabsorption of the gas. Alternatively, the

TABLE 1

| Sensing material | Sensible analyte | Whether the ultraviolet light sensing can be performed | Whether the humidity sensing can be performed | Whether the temperature sensing can be performed |
|---|---|---|---|---|
| Silicon | $NO_2$, $NH_3$, $H_2$, CO, $H_2O$, ethanol, $SO_2$ | No | Yes | Yes |
| Carbon nanotube | $NO_2$, $NH_3$, $H_2$, $CH_4$, CO, $SO_2$, $H_2S$, $O_2$, NO, ethanol | No | No | No |
| Graphene | $NO_2$, $NH_3$, $H_2$, CO, $H_2O$, ethanol | No | Yes | No |
| Graphene oxide | $NO_2$, $NH_3$, $H_2$, CO, $H_2O$ | No | Yes | No |
| Zinc oxide | $NO_2$, $NH_3$, $H_2$, $CH_4$, CO, $H_2S$, $O_2$, NO, $H_2O$, ethanol | Yes | Yes | No |
| Tin dioxide | $H_2$, $CH_4$, CO, $SO_2$, $O_2$, $H_2O$, ethanol, $C_2H_2$ | Yes | Yes | No |
| Indium oxide | $NO_2$, $CH_4$, CO, ethanol, $C_2H_4$ | Yes | Yes | No |
| Tungsten trioxide | $NO_2$, $NH_3$, $H_2$, $CH_4$, CO, $SO_2$, $H_2S$, $O_2$, NO, benzene, ethanol, $O_3$, $Cl_2$ | No | Yes | No |
| Magnesium oxide | $NO_2$, $SO_2$, $O_2$ | Yes | Yes | No |
| Titanium dioxide | $NO_2$, $NH_3$, CO, $H_2O$, $SO_2$, $O_2$ | Yes | Yes | No |
| Ferric oxide | ethanol, methanol, and acetone | No | Yes | No |
| Nickel | — | No | No | Yes |
| Copper | — | No | No | Yes |
| Au cluster | volatile organic compounds | No | No | No |

For instance, if the selected sensing material may sense the gas, the sensing layer 112 is a gas sensing structure. If the selected sensing material may sense the ultraviolet light, the sensing layer 112 is an ultraviolet light sensing structure. If the selected sensing material may sense the humidity, the sensing layer 112 is a humidity sensing structure. If the selected sensing material may sense the temperature, the sensing layer 112 is a temperature sensing structure.

For instance, if titanium dioxide is selected as the sensing material, the sensing layer 112 may sense the gas molecules, such as $NO_2$, $NH_3$, CO, $H_2O$, $SO_2$, $O_2$, the ultraviolet light and the humidity, which is the gas sensing structure, the ultraviolet light sensing structure and the humidity sensing structure simultaneously.

In an embodiment, the second electrode 110 has a gap. The gap of the second electrode 110 has an appropriate size, extent of reaction may be controlled by the heating plate 114, or the temperature may be controlled by the heating plate 114 to adjust the effect of moisture. A material of the heating plate 114 may be gold, platinum, palladium, silver, copper, nickel, aluminum, carbon, or a combination thereof.

Figure 5:
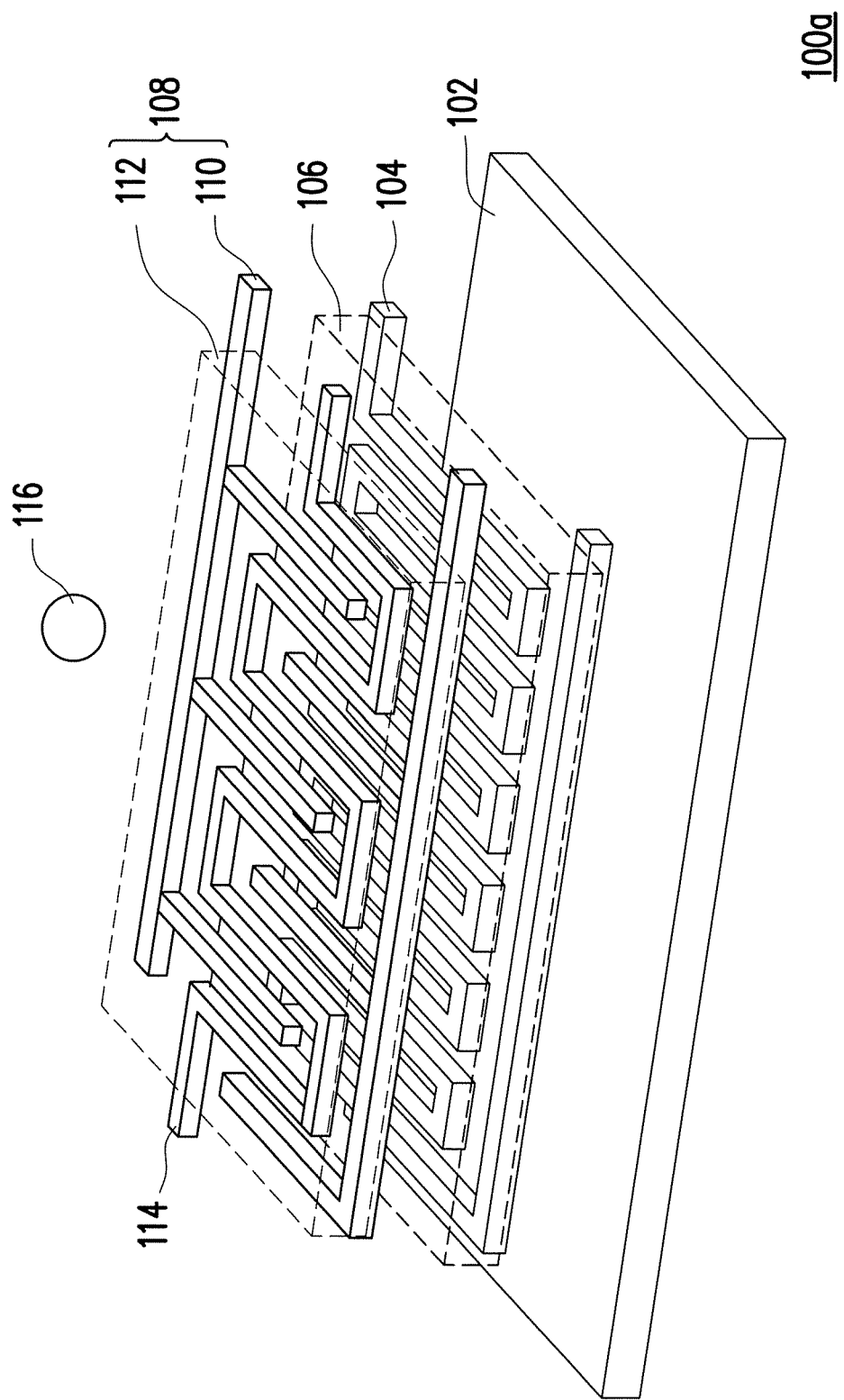
FIG. 5 is a schematic view of a multifunctional sensor according to yet another embodiment of the invention.

In an embodiment, the multifunctional sensor of the invention further includes a light source providing light to the sensing layer. FIG. 5 is a schematic view of a multifunctional sensor 100b according to yet another embodiment of the invention. Referring to FIG. 5, a light source 116 is disposed on the sensing layer 112. The light source 116 provides the light to the sensing layer 112, so that the sensing material in the sensing layer 112 is photoexcited. Thereby, the multifunctional sensor 100b can get better selectivity and sensitivity at room temperature. Alternatively, by the method of photoexciting the sensing material in the sensing layer 112, the gas molecules on the surface of the sensing material are decomposed to activate the multifunctional sensor 100*b*, so as to provide better stability and repeatability for the multifunctional sensor 100*b*. The invention does not specifically limit the position of the light source 116. The light source 116 may be located above the sensing layer 112, at a periphery of the sensing layer 112 or other appropriate positions, as long as the light source 116 can provide the light to the sensing layer 112, which are within the scope of the invention. In an embodiment, the light source 116 is a light emitting diode, for example.

Figure 6:
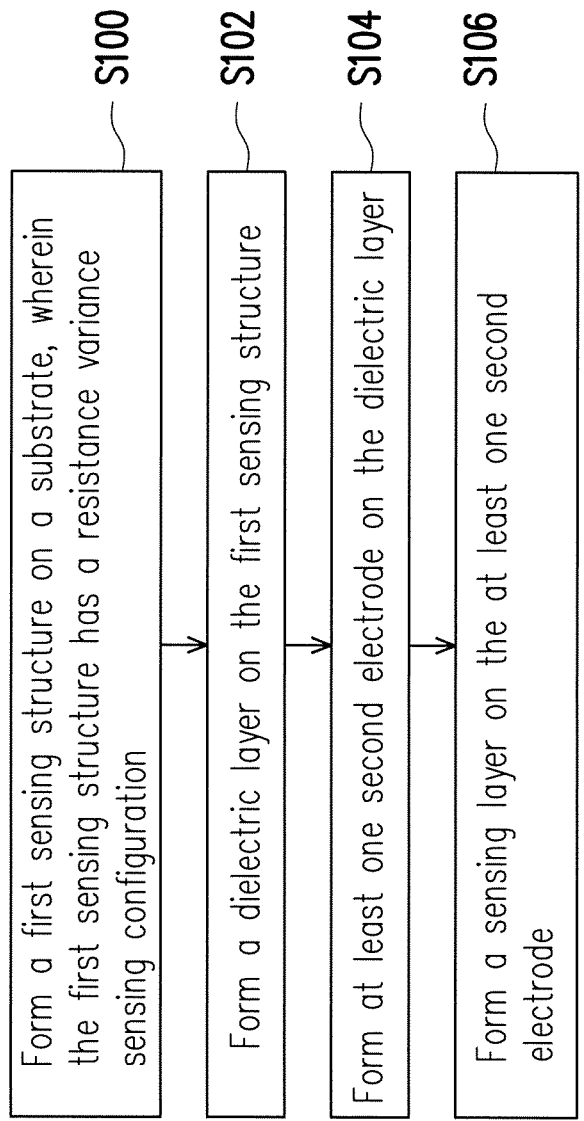
FIG. 6 is a flow chart of a manufacturing method of a multifunctional sensor according to an embodiment of the invention.

FIG. 6 is a flow chart of a manufacturing method of a multifunctional sensor according to an embodiment of the invention. Referring to FIG. 6 and FIG. 2 to FIG. 5, in Step S100, the first sensing structure 104 is formed on the substrate 102. The first sensing structure 104 has the resistance variance sensing configuration. In Step S102, the dielectric layer 106 is formed on the first sensing structure 104. In Step S104, at least one second electrode 110 is formed on the dielectric layer 106. In Step S106, the sensing layer 112 is formed on the at least one second electrode 110. The detailed configuration and function of each component are described in the aforementioned paragraphs, and will not be repeated.

In an embodiment, after forming the second electrode 110 and before forming the sensing layer 112, the heating plate 114 is formed in the gap of the second electrode 110. The detailed configuration and function of the heating plate 114 are described in the aforementioned paragraphs, and will not be repeated.

In an embodiment, after forming the sensing layer 112, the light source 116 providing the light to the sensing layer 112 is formed. The detailed position, type and function of the light source 116 are described in the aforementioned paragraphs, and will not be repeated.

In an embodiment, a method of forming the first sensing structure, the dielectric layer and the second sensing structure includes three-dimensional printing. Specifically, the steps of forming the first electrode, forming the dielectric layer, forming the at least one second electrode and forming the sensing layer include three-dimensional printing. Furthermore, the step of forming the first electrode includes spraying the material of the first electrode on the substrate. The step of forming the dielectric layer includes spraying the material of the dielectric layer on the first electrode. The step of forming the second electrode includes spraying the material of the second electrode on the dielectric layer. The step of forming the sensing layer includes spraying the material of the sensing layer on the second electrode. The step of forming the heating plate includes spraying the material of the heating plate in the gap of the second electrode. The step of forming the light source includes spraying the material of the light source on the sensing layer. The light source may be a back plate of an illuminating lamp or an electronic device, such as a fluorescent lamp, a halogen lamp, an LED lamp, an OLED lamp, or a backlight module. The implementation method is to place the completed sensor on the periphery of the light source, such as on a mask, a frame, a case, a fan, heat dissipation hole, or where the light source can be reached. The multifunctional sensor of the invention which is formed by the three-dimensional printing method can omit the complicated steps required for the conventional semiconductor process. Additionally, when forming an upper layer of the sensing structure, the damage to a lower layer of the sensing structure which has been formed can be avoided. Furthermore, when forming each component, the multifunctional sensor of the invention which is formed by the three-dimensional printing method only needs to replace the ink required to form different components. Thus, it will not cause the problem of cross-contamination between different materials.

The multifunctional sensors in the above embodiments are illustrated by a sandwich structure having two sensing structures and one dielectric layer, but the invention is not limited thereto. The multifunctional sensor may include more sensing structures and dielectric layers. The sensing structures and the dielectric layers may be stacked to each other. In some embodiments, all the sensing structures and the dielectric layers may be formed on a single side of the substrate using the three-dimensional printing method.

In summary, the plurality of sensing structures of the multifunctional sensor of the invention are located on the same side of the same substrate which can effectively reduce the volume of the multifunctional sensor. Additionally, the multifunctional sensor of the invention which is formed by the three-dimensional printing method can avoid the damage to the lower layer of the sensing structure which has been formed when forming the upper layer of the sensing structure, and the problem of cross-contamination between different materials will not be caused.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A multifunctional sensor, comprising:
   a substrate;
   a first sensing structure, disposed on the substrate;
   a dielectric layer, disposed on the first sensing structure; and
   a second sensing structure, disposed on the dielectric layer, wherein the second sensing structure comprises:
   a second electrode, disposed on the dielectric layer; and
   a sensing layer, disposed on the second electrode;
   wherein the first sensing structure and the second sensing structure are located on the same side of the substrate.

2. The multifunctional sensor according to claim 1, wherein the first sensing structure comprises a first electrode having a resistance variance sensing configuration.

3. The multifunctional sensor according to claim 2, wherein the first sensing structure comprises a pressure sensing structure.

4. The multifunctional sensor according to claim 2, wherein the first sensing structure comprises a temperature sensing structure.

5. The multifunctional sensor according to claim 2, wherein the first electrode comprises an interdigital electrode.

6. The multifunctional sensor according to claim 1, further comprising a heating plate, located in a gap of the second electrode.

7. The multifunctional sensor according to claim 1, further comprising a light source, disposed on the sensing layer or at a periphery of the sensing layer.

8. The multifunctional sensor according to claim 1, wherein the second electrode comprises an interdigital electrode or a thin film transistor.

9. The multifunctional sensor according to claim 1, wherein the second electrode has a gap, and the sensing layer is disposed on the second electrode and in the gap of the second electrode.

10. The multifunctional sensor according to claim 1, wherein a sensing material of the sensing layer comprises a group IV element or an oxide thereof.

11. The multifunctional sensor according to claim 1, wherein a material of the sensing layer comprises silicon, carbon nanotubes, graphene, graphene oxide, zinc oxide, tin dioxide, indium oxide, tungsten trioxide, magnesium oxide, titanium dioxide, ferric oxide, nickel, copper, Au clusters, or a combination thereof.

12. The multifunctional sensor according to claim 1, wherein a method of forming the first sensing structure comprises three-dimensional printing.

13. The multifunctional sensor according to claim 1, wherein a method of forming the dielectric layer comprises three-dimensional printing.

14. The multifunctional sensor according to claim 1, wherein a method of forming the second sensing structure comprises three-dimensional printing.

15. The multifunctional sensor according to claim 1, wherein a material of the substrate comprises a porous material, and a portion of the first sensing structure extends into pores of the substrate.

16. The multifunctional sensor according to claim 1, wherein a material of the substrate comprises a nano-cellulose material.

17. The multifunctional sensor according to claim 16, wherein a pore size of pores of the nano-cellulose material is 0.2 nanometers to 500 nanometers.

18. The multifunctional sensor according to claim 1, wherein the first sensing structure comprises:
   a first electrode, disposed on the substrate; and
   a first electrode sensing layer, disposed on the first electrode.

19. The multifunctional sensor according to claim 18, wherein the first electrode is an interdigital electrode.

* * * * *